June 18, 1957  A. RAZDOW  2,795,995
DEVICE FOR A NON-DESTRUCTIVE DIMENSIONAL
INSPECTION OF MECHANICAL PARTS
Filed April 28, 1954  3 Sheets-Sheet 1

INVENTOR.
ADOLPH RAZDOW
BY
ATTORNEY

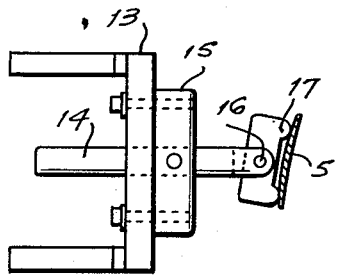
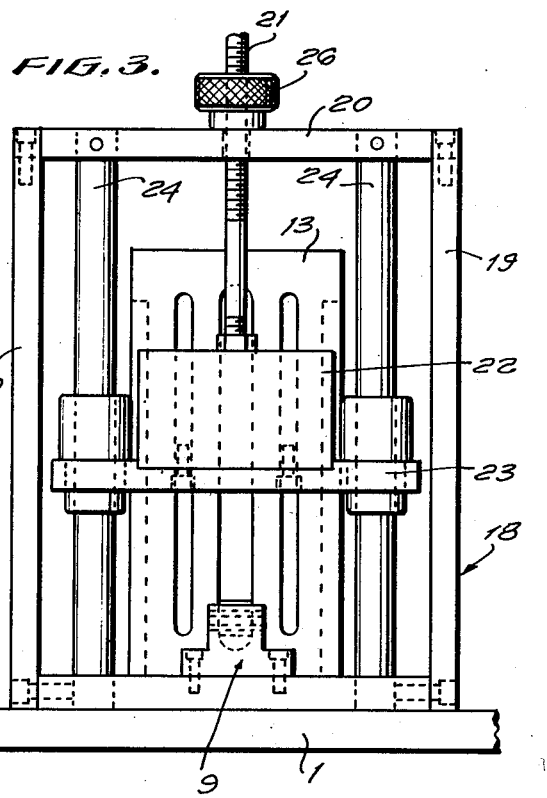
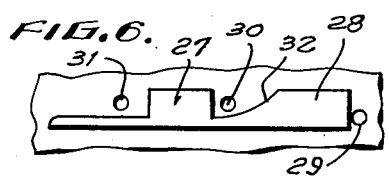
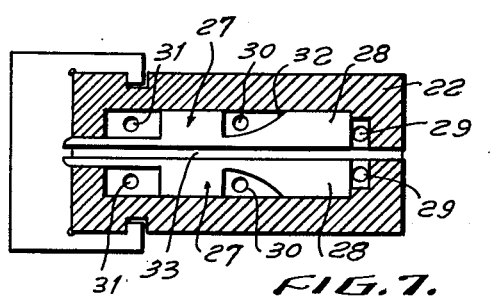
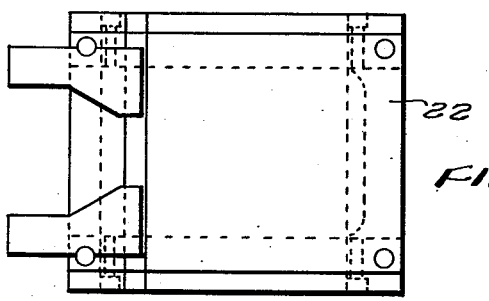

June 18, 1957     A. RAZDOW     2,795,995
DEVICE FOR A NON-DESTRUCTIVE DIMENSIONAL
INSPECTION OF MECHANICAL PARTS Filed April 28, 1954     3 Sheets-Sheet 3

INVENTOR.
ADOLPH RAZDOW
BY
ATTORNEY

United States Patent Office 2,795,995
Patented June 18, 1957

2,795,995

DEVICE FOR A NON-DESTRUCTIVE DIMENSIONAL INSPECTION OF MECHANICAL PARTS

Adolph Razdow, Montclair, N. J.

Application April 28, 1954, Serial No. 426,200

17 Claims. (Cl. 88—24)

The present invention relates to an apparatus for and method of dimensional inspection of mechanical parts, in general, and of blades or vanes, for example, in turbines, axial flow compressors or the like, in particular.

Devices, which concern themselves with the inspection of pieces of work and the marking thereon of location points by which the piece of work may be accurately positioned for subsequent machining, are known. These known devices use generally means for projecting a plurality of longitudinally spaced cross-sectional contours of the workpiece together with a plurality of marking tools, whereby means were provided for supporting the tools in operative relation to the workpiece, the latter being adjustable with respect to the plurality of tools by reference to projected images for accurately locating the tools with respect to the workpiece.

While these devices and the method for inspection by using such devices have been found sufficient in some situations, they were lacking in other instances because the result achieved by the known devices in such other instances were found insufficient.

Other known methods to achieve the same end include the so-called wire method which is only capable of checking on two points, which method operated by projection of the front face of the fir tree of a turbine blade in the shadowgraph, which gauges only the front section, and leaving unchecked from the front to the rear. Still other systems have been tried for solving the problem which use mechanical, electrical or acoustical tracers. Minuteness of space and accuracy discourage the use of these known systems. In order to obtain a reading accuracy of 0.0001 inch, the tracer must have a point which is much smaller, having a diameter not greater than 0.00002 inch, an expedient which is impossible to obtain with the actually known physical methods. The smallest space that also exists in the female part of the fir tree permits no location of mechanical or other tracers. Mechanical tracers with levers are not suitable for the present purpose because of the unavoidable "play" in the bearings, which cannot be eliminated for practical purposes.

The only tracers, therefore, having the minutest size, are light beams. Projections of the fir tree can only be made from the front or back faces thereof. Thus, a projection of its middle portion is not possible, though substantial errors between the two end faces may exist. It has been thus found that two-dimensional testing methods did not suffice. If all sections from the front to the rear are optically analyzed, a complete evaluation of the dimensional tolerances is made possible.

It is, therefore, one object of the present invention to provide an apparatus for making precise castings of an adequate plurality of sections of the fir tree along an appropriate, predetermined axis, so that the summary of all said sections brings about a three-dimensional testing of the fir tree.

It is another object of the present invention to provide a method for evaluating the dimensional tolerances of a workpiece by optical comparison of a plurality of castings of adequate sections of the workpiece with an optical projection of a master drawing.

It is still another object of the present invention to provide an apparatus which includes means for automatically or semi-automatically moving each of the obtained sections into the projecting position and upon terminating the comparative projection with the theoretical pattern to move each of the sections back into its neutral position.

With these and other objects in view which will become apparent in the following detailed description, the present invention will be clearly understood in connection with the accompanying drawings, which disclose by example only one of a plurality of embodiments of the present invention and in which:

Fig. 3 is an end view of the apparatus;

Fig. 4 is a fragmentary view showing the engagement member for the blade;

Fig. 5 is a section along the lines 5—5 of Fig. 1;

Fig. 6 is an elevation of one of the pins used for forming the casting shown at an enlarged scale;

Fig. 7 is a cross-sectional elevation of the cast;

Fig. 8 is a plan view of the cast body;

Figure 1:
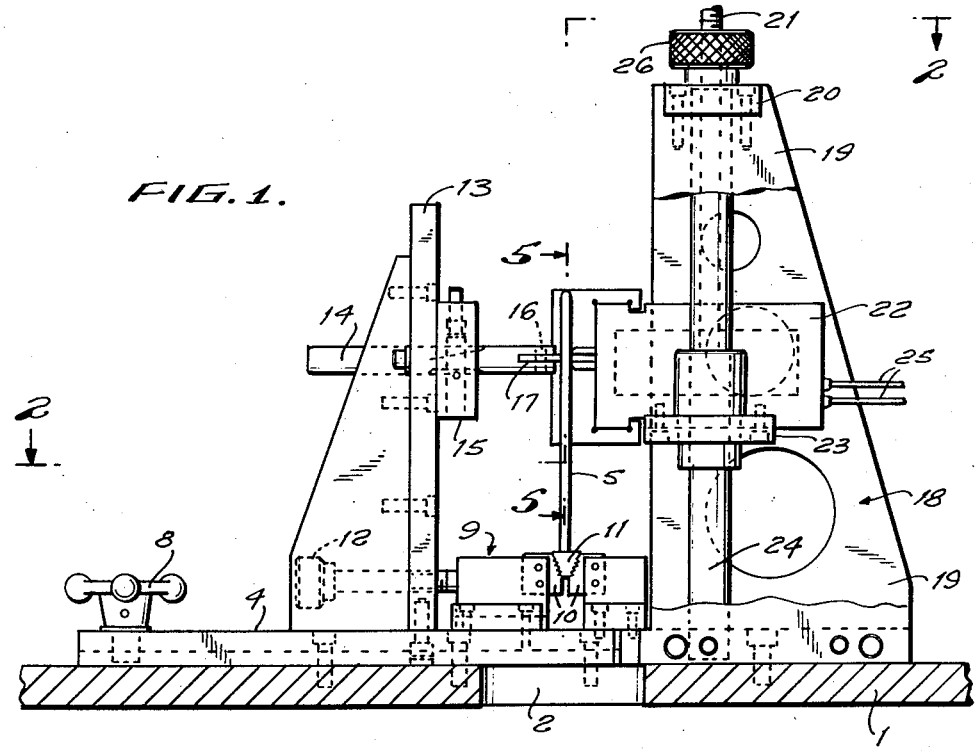
Figure 1 is an elevation of the apparatus for forming the plurality of castings.
Figure 2:
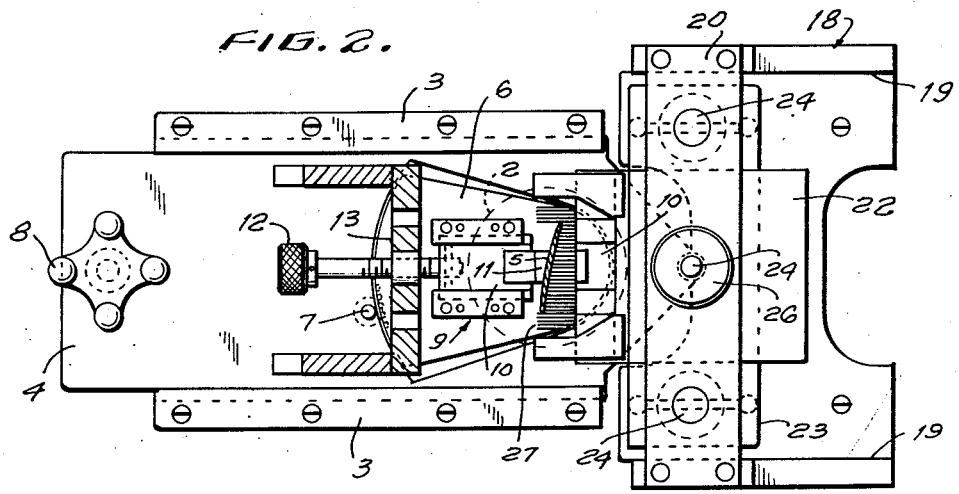
Fig. 2 is a section along the lines 2—2 of Fig. 1.

It is of importance to use a casting material which does not affect chemically or physically the workpiece and it is, therefore, preferred to use alloys with a low melting point. A further principal requirement for the casting material is that it is not subjected to shrinkage and rather has a tendency of a slight expansion upon cooling. The following materials have been found suitable for this purpose:

(a) Thermosetting plastics
(b) Magnetic powder fluids
(c) Gallium
(d) Low melting alloys
(e) Powdered metals
(f) Sprayed metals
(g) Any suitable sprayed plastics In the determination which one of the casting materials is best suitable for a particular workpiece, the accuracy of the contact mold as well as post-mold shrinkage, the storageability in relation to surface variation, the thickness and material of the separating plates, the mechanical rigidity and the formation of flash is to be considered.

It has been found that low melting alloys are the best material for giving superior results. The following examples are given now for such low melting alloys:

(1) A low melting alloy known as "Cerro Low," which consists of 58% Bi and 42% Sn;

(2) A low melting alloy known as "Cerro Base," consisting of 55.5% Bi and 44.5% Sn;

(3) A low melting alloy known as "Cerro Bend," consisting of 48% Bi, 28.5% Pb, 14.5% Sn, and 9% Sb.

In accordance with the method of the present invention, all sections may be cast individually or simultaneously, whereupon the mechanical and/or optical evaluation may be performed successively. In certain cases, it may be sufficient to provide the casting of only one important section which is to be checked. As will be pointed out later in more detail, each section is preferably attached to a moving table which engages a cam for moving each section in forward direction for optical projection. Simultaneously, proper mechanical means are provided to move the optical system in such manner that an exact focus is maintained for each of the sections, the evaluation being obtained by projecting onto the screen of a shadowgraph or any other appropriate optical projection system.

In accordance with another feature of the present invention, it is preferred to heat the workpiece under test up to 20° F. lower than the melting point in order to anticipate an overall error due to difference in temperature between the ambient room temperature and the melting temperature of the casting material. For example, the terminal linear coefficient of expansion for steel is $6.1 \times 10^6$ per degree F. An increase of 20° F. will expand one inch of the workpiece by only 0.000012 inch. If such variations are negligible, the workpiece could be maintained at ambient room temperature. For 10° F. temperature increase, the linear expansion per inch for steel is 0.00003 inch. The local heat developed is negligible if the total mass to be cast is larger than the mass of the castings. The liquid metal would solidify immediately upon contact with the fir tree at ambient room temperature.

The heat necessary to melt the casting material could be gained by any conventional means, as from an oil container whose temperature is maintained constant by a thermostat. Accuracy of the casting will be greater if the temperature of the container receiving the pressure fluid, as for instance oil, is maintained at exact melting temperature rather than at one lower or higher. While any suitable means may be used for local heating, one of the possibilities would be induction heating.

The present method is performed in such manner that the molten metal will be poured into the cast which is subdivided by thin steel or brass sections or pins which contact the surface of the workpiece as closely as possible. Proper pressure must be applied in order to get a very close contact between the molten metal and the face of the workpiece to be tested. Such pressure may be determined by providing a higher head or by providing proper fluid pressure, as for instance by small hydraulic pumps, which are known in casting apparatus.

The linear distortion of the screen on which the comparative optical tests are performed will be checked with standard sections or with a cast of comparison plates lapped to an optical finish. The chromatic distortion may be eliminated by the use of mono-chromatic light if higher accuracies are required. It is also preferable to project a test pattern onto the screen for an exact evaluation of linear distortion due to the optical process. Furthermore, in order to make an easier determination of any discrepancy between the projection of the cast section and the master pattern, different colors, as for instance red and blue, may be used for the respective projections.

If there is no desire to conserve the cast upon finishing the comparative optical test, it may be re-melted by an appropriate heating system and the liquid metal then poured into the subsequent cast. If it is, however, required to preserve the formed cast sections, each section may receive markings for storing and classification. The melting pot feed line may be shut off by a mechanically or electrically operated valve which is heated either by the pressure fluid line or by a particular heater.

Referring now to the drawings and in particular to Figs. 1 to 8 in which one embodiment of the apparatus is disclosed, the device comprises a horizontally disposed base 1, which is equipped with a preferably circular opening 2 for the purpose, as will be described later, to project a light beam towards any one of a plurality of casts. The base 1 carries two parallel disposed guide members 3 which are adapted to form a guide for a carriage 4 which is movable along the base 1 between the guide member 3. The carriage 4 is adapted to be moved into a position in which the opening 2 is covered up and back into an inoperative position in which the turbine blade or any other workpiece 5 is simultaneously removed from its cast forming position. A turntable 6 is built into the carriage 4, which turntable 6 is preferably of sector-like shape and permits an angular displacement relative to the carriage 4 for a few degrees in each direction by means of an operating screw 7. A hand-operated screw 8 is inserted into the carriage 4 for the purpose to lock the latter in any desirable position. It is to be understood, however, that additional securing means for the carriage 4 may be provided, as for instance by set screws (not shown) extending on the side through the guide members 3. A vise 9 is properly secured to the turntable 6 which is adapted to receive two clamp members 10 formed substantially complementary to the fir tree 11 of the workpiece or blade 5. A screw bolt 12 carrying one of the clamp members 10 is adapted to open and close the vise 9, respectively, which screw bolt 12 is received by an upwardly extending bracket 13, likewise mounted on the turntable 6, the bracket 13 having thread complementary to the screw bolt 12.

As particularly clearly shown in Fig. 4 of the drawing, the upper portion of the bracket 13 has secured thereto a second bolt 14 by means of a mounting 15 adequately secured to the bracket 13 and the forward end of the bolt 14 carries, by means of a pivot 16, an abutment member 17 which, due to its pivotal connection with the bolt 14, permits angular adjustment when engaging the face of the blade 5. The abutment member 17 is adapted to assume the pressure exerted against the blade 5 upon injecting the pressure fluid in the casting process.

The base 1 supports a second bracket 18 disposed on the opposite side of the blade 5, which bracket 18 comprises substantially a frame 19. The upper connection 20 of the frame 19 has inner thread and is adapted to receive a vertically disposed threaded bolt 21 to carry the pressure box 22 supported by a plate 23, the ends of which are received by two posts 24 on which the ends of the plate 23 may slide in upward and downward movement, respectively, thereby providing sufficient guide members for the pressure box 22. As shown in Fig. 1, pressure fluid feed lines 25 lead to the pressure box 22. A hand-operated nut 26 retains the pressure box 22 in any desirable position.

As particularly clearly shown in Figs. 6 and 7, a plurality of sections or pins 27 are disposed in parallel arrangement in the pressure box 22 and extend therefrom or may be withdrawn thereinto depending upon the control of the fluid pressure. Each one of the pins 27 is of such configuration to permit the exertion of fluid pressure to provide a projecting movement for the blade 5 and a withdrawing movement, respectively. For this purpose, each of the pins 27 has a projecting portion 28 and in front and rear of the projection portion 28 fluid outlets 29 and 31 are provided and an additional outlet 30 may also be arranged intermediate of each of the sections or pins 27, which outlet 30 is adapted for removal of superfluous oil escaping from the pressure fluid chamber. In case a forward movement of the sections 27 is desired, conventional valve means (not shown) feed the pressure fluid to the outlet 29, thereby bringing about the advancement of the section or pin 27. On the other hand, if section or pin 27 is to be withdrawn, the conventional valve means are changed to the position in which the pressure fluid is fed to the outlet 31 bringing about a withdrawal of the section or pin 27. Each pair of parallel disposed sections or pins 27 forms a compartment 33 in which the cast is formed. The projecting movement of each of the pins 27 permits of an advancement thereof in accordance with the contour of the workpiece, within the accuracy determined by the thickness of each pin. The slight remaining space between the end face of each pin and the workpiece will be filled in by the ejected metal.

Figure 9:
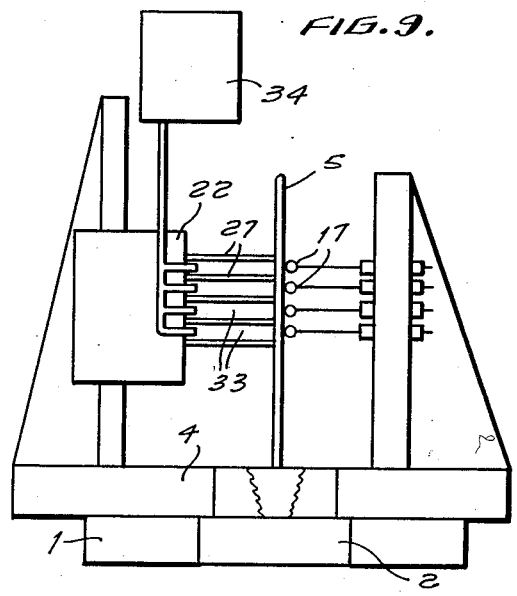
Fig. 9 is a diagrammatically shown elevation of the apparatus for forming a plurality of casts.
Figure 10:
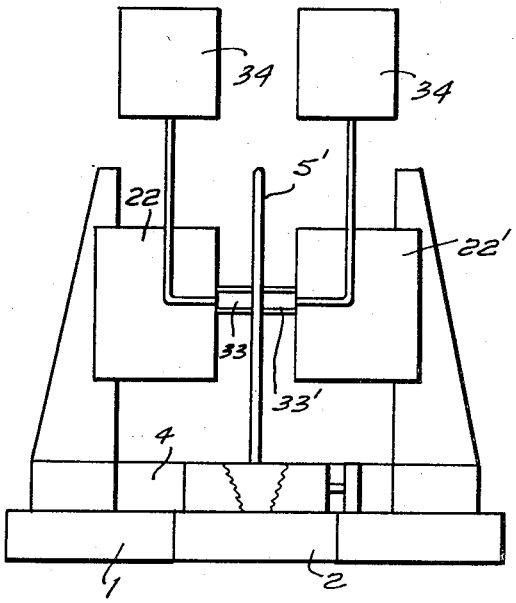
Fig. 10 is a diagrammatically shown other embodiment of the apparatus for making casts.

As indicated schematically in Figs. 9 and 10, two different embodiments are shown, namely in Fig. 9 an arrangement is shown in which on the left side the pressure box 22 has a plurality of sections or pins 27 forming a plurality of compartments 33, while the opposite face of the blade or workpiece 5 is supported by abutment members 17. On the other hand, in the arrangement shown in Fig. 10, the abutment members are replaced by a second pressure box 22' disposed on the opposite side of the blade and compartments 33 and 33' are provided on both sides of the blade or workpiece 5', the pressure fluid being fed from pressurized fluid containers 34 and 34', respectively, so that the pressure on both sides of the blade or workpiece 5' is substantially equalized.

Figure 11:
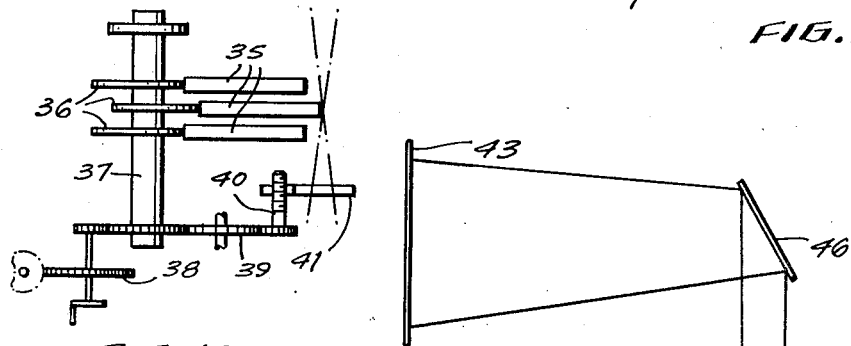
Fig. 11 is a diagrammatic showing for automatically moving into focus for optical comparison the respective cast sections.

As indicated particularly in Fig. 11, each one of the formed casts 35 is disposed in parallel arrangement and a plurality of cams 36 is secured to a shaft 37. The latter is rotated by any convenient gear drive 38 and a continuing gear train 39 which includes a threaded shaft 40 provides a guide means for the lens system 41 which simultaneously with the distance of the respective casts 35 is advanced or withdrawn into its proper focussing position.

Figure 12:
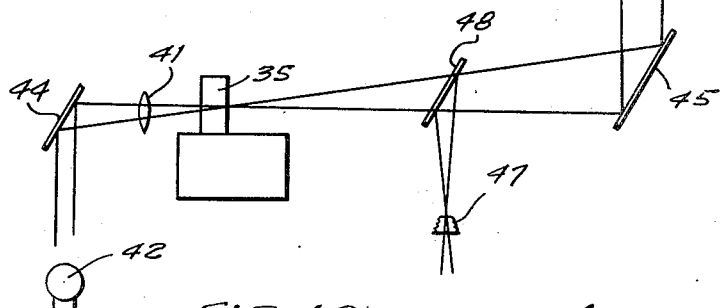
Fig. 12 is a schematic showing of the optical system used for the purpose of the present invention.

The evaluation of the formed cast 35 in comparison with a theoretical pattern is achieved by optical means. As schematically shown in Fig. 12, a light source 42 is used to project light on a screen 43 by means of mirrors 44, 45 and 46. A lens system 41 is disposed within the light train and projects the cast 35 thus properly on the screen 43. A master pattern 47 is simultaneously projected by means of the mirror 48 on the same screen 43 and any discrepancy between the projected picture of the cast 35 and that of the master pattern 47 is clearly apparent on the screen 43.

While I have disclosed several embodiments of the present invention, it is to be understood that these embodiments are given by example only and not in a limiting sense, the scope of the present invention being determined by the objects and the claims.

I claim:

1. An apparatus for optically gauging profiles of a workpiece comprising a workpiece holder adapted to retain the said workpiece in position, a pressure box, two parallel disposed sets of a plurality of pins axially slidably disposed in the said box, pressure means for advancing and withdrawing, respectively, the said pins from and into the said pressure box, said two sets of pins being spaced apart and defining a compartment, the front end of each of the said pins being advanced for engagement with the said workpiece, means for feeding molten material into said compartment to form a cast therein, means for relative movement between the said pressure box and said workpiece in order to permit the forming of a plurality of casts corresponding to a plurality of sections of the said workpiece, a screen, a master profile element bearing a master profile, optical projection means for projecting one of said casts from the position in which it was formed simultaneously with the said corresponding master profile onto said screen, thereby permitting the evaluation of any discrepancy between the projection of the profile of the said cast and that of the said master profile.

2. The apparatus, as set forth in claim 1, in which the said workpiece holder includes means for setting the latter in any predetermined position, and further means for turning the said workpiece holder upon the longitudinal axis of the said workpiece.

3. The apparatus, as set forth in claim 1, in which the said pressure means comprise a pressure fluid, and means for selectively feeding the said pressure fluid to different sides of the said pins in order to advance and to withdraw, respectively, the latter.

4. The apparatus, as set forth in claim 1, in which the said means for feeding molten metal into each of the said compartments include ejector means connected with a fluid container.

5. The apparatus, as set forth in claim 1, in which the said means for advancing successively each one of the said plurality of casts comprises a shaft carrying a plurality of cams, each of the said cams being coordinated to one of the said casts, means for rotating the said shaft, the latter means including means for moving the said optical projection means into proper focus position corresponding to each of the said advanced casts.

6. The apparatus, as set forth in claim 1, which includes means for withdrawing the said workpiece holder together with the said workpiece, in order to permit projection of the end face of each of said casts onto said screen, said end face being complementary to the corresponding section of said workpiece.

7. The apparatus, as set forth in claim 1, which includes means for advancing and withdrawing, respectively, successively each one of the said plurality of casts.

8. An apparatus for optically gauging profiles of a workpiece comprising a workpiece holder adapted to retain the said workpiece in position, a pressure box disposed at opposite sides of said workpiece, two parallel disposed sets of a plurality of pins slidably disposed in each of the said boxes, pressure means for advancing and withdrawing, respectively, the said pins from and into the said corresponding pressure boxes, said two sets of pins being spaced apart and defining a compartment in each of said boxes, each of the said pins being advanced for engagement with the said workpiece, means for feeding molten material into each of the said compartments to form a cast therein, means for relative movement between said pressure box and said workpiece in order to permit the forming of a plurality of oppositely disposed casts corresponding to a plurality of sections of the said workpiece, a screen, a master profile element bearing a master profile corresponding with the respective sections of said workpiece, optical projection means for projecting one of the said casts from the position in which it was formed simultaneously with the said corresponding master profile onto said screen, thereby permitting the evaluation of any discrepancy between the projection of the profile of the said cast and that of the said master profile.

9. A method for gauging profiles of a workpiece comprising the steps of forming a plurality of casts in accordance with a plurality of parallel sections of the profile of a workpiece, projecting the image of the profile of each of said casts of a section while in its formed position simultaneously with the profile of a corresponding similar master profile onto a single screen, in order to evaluate any discrepancy between the profile of the said cast and that of said similar master profile.

10. A method for gauging and positioning profiles of a workpiece comprising the steps of forming a plurality of casts in accordance with a plurality of parallel sections of the profile of a workpiece, projecting the profile of each of said casts of a section while in its formed position simultaneously with the profile of a corresponding similar master profile onto a single screen, and positioning the profile of each of said casts of a section simultaneously with the profile of said corresponding similar master profile, in order to evaluate any discrepancy between said profile and the relative position of said casts and that of said similar master profiles.

11. A method for gauging and positioning a profile of a workpiece comprising the steps of forming a cast in accordance with a section of the profile of a workpiece, projecting the profile of said cast of said section while in its formed position simultaneously with the profile of a corresponding similar master profile onto a single screen, and positioning the profile of said cast of a section simultaneously with the profile of said corresponding similar master profile, in order to evaluate any discrepancy between said profile and the relative position of said cast and that of said similar master profile.

12. A method for gauging profiles of a workpiece comprising the steps of forming simultaneously a plurality of casts in accordance with a plurality of parallel sections of the profile of a workpiece, projecting the image of the profile of each of said casts of a section while in its formed position simultaneously with the profile of a corresponding similar master profile, in order to evaluate any discrepancy between the profile of the said cast and that of said similar master profile.

13. A method for gauging and positioning a profile of a workpiece comprising the steps of forming simultaneously a cast in accordance with a section of the profile of a workpiece, projecting the profile of said cast of said section while in its formed position simultaneously with the profile of a corresponding similar master profile, and positioning the profile of said cast of a section simultaneously with the profile of said corresponding similar master profile, in order to evaluate any discrepancy between said profile and the relative position of said cast and that of said similar master profile.

14. A method for gauging and positioning a profile of a workpiece comprising the steps of forming a cast in accordance with a section of the profile of a workpiece, projecting the profile of said cast of said section while in its formed position simultaneously with the profile of a corresponding similar master profile, and positioning the profile of said cast of a section simultaneously with the profile of said corresponding similar master profile, in order to evaluate any discrepancy between said profile and the relative position of said cast and that of said similar master profile.

15. An apparatus for optically gauging profiles of a workpiece comprising a workpiece holder adapted to retain the said workpiece in position, a box, two parallel disposed sets of a plurality of pins axially slidably disposed in the said box, means for advancing and withdrawing, respectively, the said pins from and into the said box, said two sets of pins being spaced apart and defining a compartment, the front end of each of the said pins being advanced for engagement with the said workpiece, means for feeding molten material into said compartment to form a cast therein, means for relative movement between the said box and said workpiece in order to permit the forming of a plurality of casts corresponding to a plurality of sections of said workpiece, a master profile element bearing a master profile, optical means for projecting said cast for comparison with a projection of said master profile, thereby permitting the evaluation of any discrepancy between the projection of the profile of the said cast and that of the said master profile.

16. The apparatus, as set forth in claim 15, which includes means for relative movement between the said workpiece holder together with the said workpiece and said box with said pins, in order to permit projection of the end face of said cast, said end face being complementary to the corresponding section of said workpiece.

17. An apparatus for optically gauging profiles of a workpiece comprising a workpiece holder adapted to retain the said workpiece in position, a box disposed at opposite sides of said workpiece, two parallel disposed sets of a plurality of pins slidably disposed in each of the said boxes, means for advancing and withdrawing, respectively, the said pins from and into the said corresponding boxes, said two sets of pins being spaced apart and defining a compartment in each of said boxes, each of the said pins being advanced for engagement with the said workpiece, means for feeding molten material into each of the said compartments to form a cast therein, means for relative movement between said boxes and said workpiece in order to permit the forming of a plurality of oppositely disposed casts corresponding to a plurality of sections of said workpiece, a master profile element bearing a master profile corresponding with the respective sections of said workpiece, optical means for projecting successively each of said casts for comparison with said corresponding master profile, thereby permitting the evaluation of any discrepancy between the projection of the profile of the said cast and that of said corresponding master profile.

References Cited in the file of this patent

UNITED STATES PATENTS

| 447,132 | Hull | Feb. 24, 1891 |
| 447,187 | Hull | Feb. 24, 1891 |
| 450,521 | Mistelski | Apr. 14, 1891 |
| 2,155,248 | Adams | Apr. 18, 1939 |
| 2,565,134 | Kish | Aug. 21, 1951 |